US012615145B2

(12) United States Patent
Potlapally et al.

(10) Patent No.: US 12,615,145 B2
(45) Date of Patent: Apr. 28, 2026

(54) CONTROLLING OPERATOR ACCESS TO CUSTOMER CLOUD INFRASTRUCTURE ENVIRONMENTS

(71) Applicant: Oracle International Corporation, Redwood Shores, CA (US)

(72) Inventors: Nachiketh Rao Potlapally, Seattle, WA (US); Karl Miller, Seattle, WA (US); Apurv Awasthi, Woodinville, WA (US); Zachary Gilburd, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 47 days.

(21) Appl. No.: 18/649,783

(22) Filed: Apr. 29, 2024

(65) Prior Publication Data

US 2024/0364509 A1      Oct. 31, 2024

Related U.S. Application Data

(60) Provisional application No. 63/462,880, filed on Apr. 28, 2023.

(51) Int. Cl.
| | |
|---|---|
| *H04L 9/08* | (2006.01) |
| *H04L 9/40* | (2022.01) |
| *H04L 67/10* | (2022.01) |

(52) U.S. Cl.
CPC ............ *H04L 9/0891* (2013.01); *H04L 63/10* (2013.01); *H04L 63/102* (2013.01); *H04L 63/20* (2013.01); *H04L 67/10* (2013.01)

(58) Field of Classification Search
CPC .................................................. H04L 9/0891
(Continued)

(56) References Cited

U.S. PATENT DOCUMENTS

| | | | |
|---|---|---|---|
| 9,092,502 | B1 | 7/2015 | Cannaliato et al. |
| 9,306,814 | B1 | 4/2016 | Roth et al. |
| 9,438,599 | B1 * | 9/2016 | Yuhan ................... H04L 63/107 |
| 9,722,895 | B1 | 8/2017 | Sarukkai et al. |
| 9,985,947 | B1 | 5/2018 | Elhard |
| 10,757,574 | B1 | 8/2020 | Rule et al. |
| 10,878,483 | B1 | 12/2020 | Felbinger et al. |
| 11,552,953 | B1 | 1/2023 | Avadhanam |

(Continued)

FOREIGN PATENT DOCUMENTS

| | | |
|---|---|---|
| EP | 2893685 B1 | 7/2017 |
| EP | 3429156 A1 | 1/2019 |

(Continued)

OTHER PUBLICATIONS

F. John Krautheim ; Private Virtual Infrastructure for Cloud Computing; USENIX:2009; pp. 1-5.*

(Continued)

*Primary Examiner* — Monjur Rahim
(74) *Attorney, Agent, or Firm* — Invoke

(57) ABSTRACT

Techniques for enabling a customer operator of a cloud service provider (CSP) the ability to disable operator access to resources in a customer cloud environment are disclosed. Operator access may be disabled or suspended by operators of the CSP customer initiating a disable command. Disabling operator access includes (a) terminating existing sessions that provide operators access to the resources, (b) rejecting new requests for credentials to establish sessions that provide operator access, and/or (c) revoking existing credentials used to establish sessions that provide operator access. Disabling operator access may apply to resources in the customer cloud environment or to a subset of resources and/or may apply to some operators but not to other operators. The operators may be of the same or different categories of operators. At the conclusion of a designated period of time, the ability of operator to access the customer cloud environment may be restored.

20 Claims, 12 Drawing Sheets

(58) Field of Classification Search
USPC .......................................................... 380/27
See application file for complete search history.

(56) References Cited

U.S. PATENT DOCUMENTS

| | | | |
|---|---|---|---|
| 11,720,536 | B1 | 8/2023 | Kisser et al. |
| 2002/0198973 | A1 | 12/2002 | Besaw |
| 2003/0154407 | A1 | 8/2003 | Kato et al. |
| 2010/0212004 | A1 | 8/2010 | Fu |
| 2011/0055399 | A1* | 3/2011 | Tung ..................... G06F 3/0481 709/226 |
| 2013/0054426 | A1* | 2/2013 | Rowland ............... G06F 9/5072 718/1 |
| 2013/0297711 | A1 | 11/2013 | Nhu |
| 2013/0304925 | A1 | 11/2013 | Ferris et al. |
| 2014/0280595 | A1 | 9/2014 | Mani et al. |
| 2015/0363852 | A1 | 12/2015 | Vautour |
| 2016/0043909 | A1 | 2/2016 | Pogrebinsky et al. |
| 2016/0142211 | A1 | 5/2016 | Metke et al. |
| 2016/0277411 | A1* | 9/2016 | Dani ................... G06F 21/6218 |
| 2017/0230229 | A1 | 8/2017 | Sasturkar et al. |
| 2018/0052861 | A1 | 2/2018 | Seetharaman et al. |
| 2018/0219784 | A1 | 8/2018 | Jiang et al. |
| 2018/0234256 | A1 | 8/2018 | Bowen |
| 2019/0087835 | A1* | 3/2019 | Schwed .............. G06F 21/6227 |
| 2019/0156000 | A1 | 5/2019 | Hoffmann et al. |
| 2019/0166007 | A1 | 5/2019 | Sundaram et al. |
| 2019/0205045 | A1 | 7/2019 | Hugot et al. |
| 2019/0213104 | A1* | 7/2019 | Qadri ................... H04L 67/1097 |
| 2020/0014659 | A1 | 1/2020 | Chasman et al. |
| 2020/0112497 | A1 | 4/2020 | Yenumulapalli et al. |
| 2020/0117757 | A1 | 4/2020 | Yanamandra et al. |
| 2020/0358756 | A1 | 11/2020 | Rose et al. |
| 2021/0216190 | A1 | 7/2021 | Vakil et al. |
| 2021/0234864 | A1 | 7/2021 | Dube et al. |
| 2021/0273914 | A1 | 9/2021 | Cobb |
| 2021/0279109 | A1 | 9/2021 | Ji et al. |
| 2021/0377272 | A1* | 12/2021 | Dasari ..................... H04L 63/20 |
| 2021/0392142 | A1 | 12/2021 | Stephens et al. |
| 2022/0091947 | A1 | 3/2022 | Kothari et al. |
| 2022/0103618 | A1 | 3/2022 | Pinheiro et al. |
| 2022/0150124 | A1 | 5/2022 | Cooley et al. |
| 2022/0255902 | A1 | 8/2022 | Woodson |
| 2022/0294818 | A1 | 9/2022 | Parekh et al. |
| 2022/0335340 | A1 | 10/2022 | Moustafa et al. |
| 2022/0374271 | A1 | 11/2022 | Pogrebinsky et al. |
| 2023/0109926 | A1 | 4/2023 | Nair et al. |
| 2023/0132478 | A1 | 5/2023 | Robinson et al. |
| 2023/0316348 | A1 | 10/2023 | Dageville et al. |
| 2023/0342179 | A1 | 10/2023 | Suttle et al. |
| 2023/0362161 | A1 | 11/2023 | Spector et al. |
| 2023/0385286 | A1 | 11/2023 | Glickman et al. |
| 2024/0054063 | A1 | 2/2024 | Wichelman et al. |
| 2024/0095739 | A1 | 3/2024 | Adogla et al. |
| 2024/0320240 | A1 | 9/2024 | Podder |

FOREIGN PATENT DOCUMENTS

| | | | |
|---|---|---|---|
| EP | 3271857 | B1 | 4/2020 |
| WO | 2014/039921 | A1 | 3/2014 |
| WO | 2018/010791 | A1 | 1/2018 |
| WO | 2021/145894 | A1 | 7/2021 |
| WO | 2021/150306 | A1 | 7/2021 |
| WO | 2021/150307 | A1 | 7/2021 |
| WO | 2021/174104 | A1 | 9/2021 |

OTHER PUBLICATIONS

"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.

"General Variables for All Requests", Jun. 28, 2023, pp. 6.

"Overview of Access Approval", Retrieved from https://cloud.google.com/assured-workloads/access-approval/docs/overview, Jun. 6, 2024, pp. 5.

"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.

"Policy Syntax", Jan. 4, 2023, pp. 7.

"Reinstate admin privileges for a customer's Azure CSP subscriptions", Retrieved from https://learn.microsoft.com/en-us/partner-center/reinstate-csp, Aug. 1, 2023, pp. 7.

"Tenant administrator settings", Retrieved from https://backstage.forgerock.com/docs/idcloud/latest/tenants/tenant-administrator-settings.html, Jun. 7, 2023, pp. 12.

"Verbs", Jun. 5, 2023, pp. 2.

Anonymbus: "Tokenization—(data security)", Wikipedia, Feb. 12, 2023, pp. 1-12.

Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.

Ducharme et al., "Seamlessly Protect Your IBM Cloud Application Infrastructure with Privileged Access Gateway", Oct. 3, 2022, pp. 13.

George et al., "Data anonymization and integrity checking in cloud computing", 2013 Fourth International Conference on Computing, Communications and Networking Technologies (ICCCNT), Jul. 2013, pp. 5.

Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.

Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.

Anonymous: "Oracle Cloud Infrastructure Documentation—Security Guide for Exadata Database Service on Cloud@Customer Systems", Apr. 1, 2023, XP093181902.

Anonymous: "Oracle Cloud Infrastructure Documentation-Overview of IAM", Feb. 8, 2023, XP093184083.

Anonymous: "Oracle Cloud Infrastructure Documentation—Renaming a Cloud Account", May 14, 2021, XP093185071.

Anonymous: "Oracle Cloud Infrastructure Documentation—Site-to-Site VPN Overview", Feb. 8, 2023, XP093184733.

Anonymous: "Oracle Cloud Infrastructure Documentation—Billing and cost management overview", Dec. 20, 2022, XP093183514.

Anonymous: "Oracle Cloud Infrastructure Documentation—Cloud Guard concepts", Jan. 18, 2022, XP093183028.

Anonymous: "Oracle Cloud Infrastructure Documentation—Getting Started with Policies", Jan. 4, 2023, XP093184099.

Anonymous: "Oracle Cloud Infrastructure Documentation—Getting Summary Information on the Overview Page", Aug. 16, 2022, XP093183031.

Anonymous: "Oracle Cloud Infrastructure Documentation—Learn Best Practices for Setting Up Your Tenancy", Feb. 8, 2023, XP093184095.

Anonymous: "Oracle Cloud Infrastructure Documentation—Managing Compartments", Feb. 8, 2023, XP093184098.

Anonymous: "Oracle Cloud Infrastructure Documentation—Monitoring Threats", Sep. 28, 2022, XP093183035.

Anonymous: "Oracle Cloud Infrastructure Documentation—Overview of the Console Dashboards Service", Mar. 14, 2023, XP093184740.

Anonymous: "Oracle Cloud Infrastructure Documentation—Prerequisites for Oracle Platform Services on Oracle Cloud Infrastructure", Mar. 23, 2023, XP093185058.

Anonymous: "Oracle Cloud Infrastructure Documentation—Welcome to Oracle Cloud Infrastructure", Mar. 23, 2023, XP093182493.

Anonymous: "Oracle Gen 2 Exadata Cloud@Customer Security Controls", Jan. 11, 2023, XP093181973.

Anonymous: "Oracle Operator Access Control Configuration and Administration Guide", Nov. 18, 2022, XP093181896.

(56) References Cited

OTHER PUBLICATIONS

Anonymous: "Oracle Public Sector Licensing and Permitting", 2022, XP093184298.
Anonymous: "Oracle Sovereign Cloud", Feb. 15, 2023, XP093184649.
AppsZfusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).

* cited by examiner

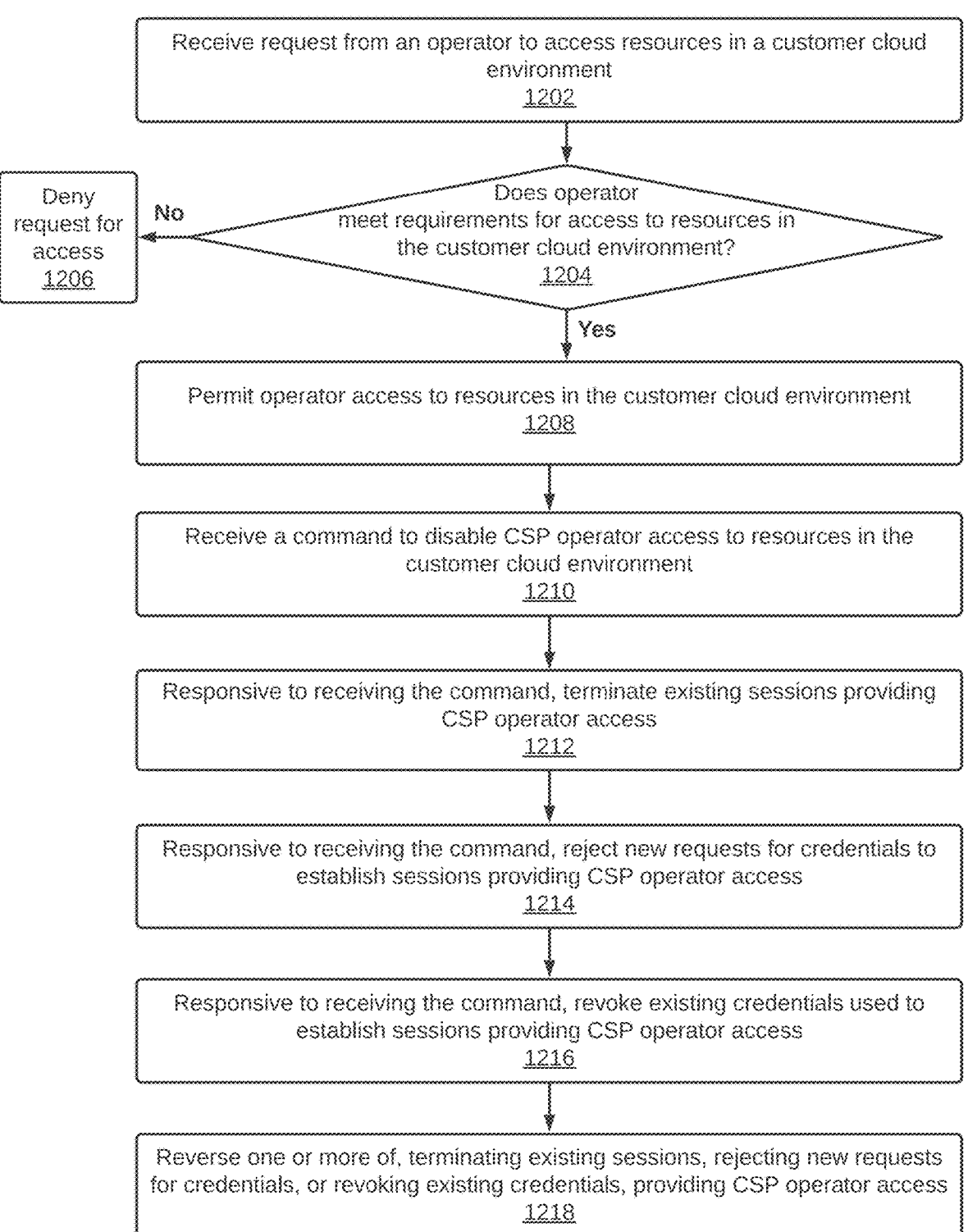

Receive request from an operator to access resources in a customer cloud environment
1202

Does operator meet requirements for access to resources in the customer cloud environment?
1204

No

Deny request for access
1206

Yes

Permit operator access to resources in the customer cloud environment
1208

Receive a command to disable CSP operator access to resources in the customer cloud environment
1210

Responsive to receiving the command, terminate existing sessions providing CSP operator access
1212

Responsive to receiving the command, reject new requests for credentials to establish sessions providing CSP operator access
1214

Responsive to receiving the command, revoke existing credentials used to establish sessions providing CSP operator access
1216

Reverse one or more of, terminating existing sessions, rejecting new requests for credentials, or revoking existing credentials, providing CSP operator access
1218

*FIGURE 12*

CONTROLLING OPERATOR ACCESS TO CUSTOMER CLOUD INFRASTRUCTURE ENVIRONMENTS

BENEFIT CLAIMS; RELATED APPLICATIONS; INCORPORATION BY REFERENCE

[1] This application claims the benefit of U.S. Provisional Patent Application 63/462,880, filed Apr. 28, 2023, which is hereby incorporated by reference.

[2] The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cloud environments. In particular, the present disclosure relates to restricting cloud service provider (CSP) operator access to a cloud infrastructure environment of a CSP customer.

BACKGROUND

A cloud computing environment can be used to provide access to a range of complementary cloud-based components, such as software applications or services, that enable organizations or enterprise customers to operate their applications and services in a highly available hosted environment.

The benefits to an organization in moving their application and service needs to a cloud environment include a reduction in the cost and complexity of designing, building, operating, and maintaining their own on-premise data center, software application framework, or other information technology infrastructure.

Maintaining and supporting the infrastructure and security of customer cloud environments require accessing a range of operator actions. Customer operators, i.e., operators associated with the customer of the CSP, perform a subset of these actions to support some triage of the customer cloud environments, e.g., level 1 and level 2 support. Deeper technical issues are handled by CSP operators, i.e., operators associated with the CSP, using another subset of actions not available to the customer operators.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 12 illustrates an example set of operations for controlling operator access to resources within a customer cloud environment in accordance with one or more embodiments.

DETAILED DESCRIPTION

Figure 1:
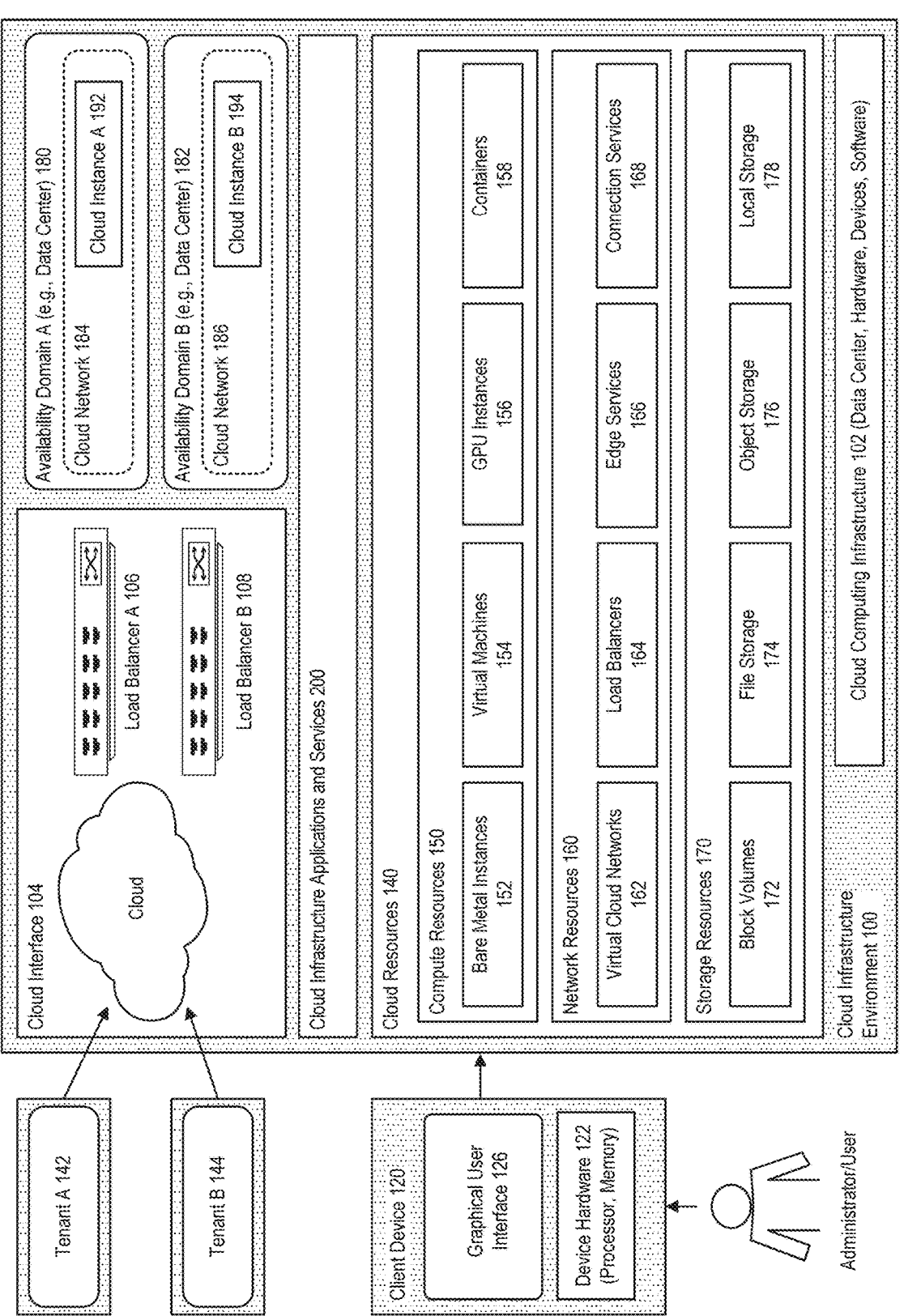
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE CLOUD ENVIRONMENTS
3. ACCESS CONTROL ARCHITECTURE
4. CONTROLLING OPERATOR ACCESS TO CLOUD RESOURCES
5. EXAMPLE EMBODIMENT
6. PRACTICAL APPLICATIONS, ADVANTAGES & IMPROVEMENTS
7. MISCELLANEOUS; EXTENSIONS

1. General Overview

One or more embodiments enable a customer operator of a cloud service provider (CSP) the ability to disable operator access to resources in a customer cloud environment. Operator access to resources in the customer cloud environment may be disabled or suspended by initiating a disable command. Disabling operator access includes (a) terminating existing sessions that provide operators access to the resources, (b) rejecting new requests for credentials to establish sessions that provide operator access, and/or (c) revoking existing credentials used to establish sessions that provide operator access. Disabling operator access may apply to all resources in the customer cloud environment or to a subset of resources. Similarly, disabling operator access may apply to some operators but not to other operators. The operators may be of the same or different categories of operators, e.g., associated with a CSP or associated with a customer of the CSP. Operator access may be disabled for a designated period of time. At the conclusion of the designated period of time, the ability of operator to access the customer cloud environment may be restored.

One or more embodiments terminate existing sessions through a bastion service that established the sessions. More particularly, the bastion service identifies the sessions to be terminated based on information recorded during the sessions. This information may include details such as whether or not the requestor of the session is a CSP operator and/or if the session is a connection into a region of the customer cloud environment. The identified sessions are terminated by the bastion service. Termination of operator access may apply to some operators but not to other operators.

One or more embodiments reject new requests for credentials through a permissions service that is configured to manage permissions. The permissions service may also revoke existing credentials. Revoking existing credentials for operator access may apply to some CSP operators but not to other CSP operators. Similarly, rejecting new requests for operator access may apply to some CSP operators but not to other CSP operators. The system may set a flag in a database accessible by one or both of (a) a bastion service configured to provision the bastion instances through which existing sessions are established or (b) a permissions services configured to manage a set of permissions.

One or more embodiments described in this Specification and/or recited in the claims may not be included in this General Overview section.

2. Example Cloud Environments

One or more embodiments provide features associated with cloud environments, including dedicated or private label cloud (PLC) environments. The cloud environments can be utilized, for example, by customers or tenants of a cloud infrastructure provider or reseller, in accessing software products, services, or other cloud offerings.

A cloud computing or cloud infrastructure environment can be used to provide access to a range of complementary cloud-based components, such as software applications or services, that enable organizations or enterprise customers to operate their applications and services in a highly available hosted environment.

The benefits to an organization in moving their application and service needs to a cloud infrastructure environment include a reduction in the cost and complexity of designing, building, operating, and maintaining their own on-premise data center, software application framework, or other information technology infrastructure.

Cloud Infrastructure Environments

Figure 2:
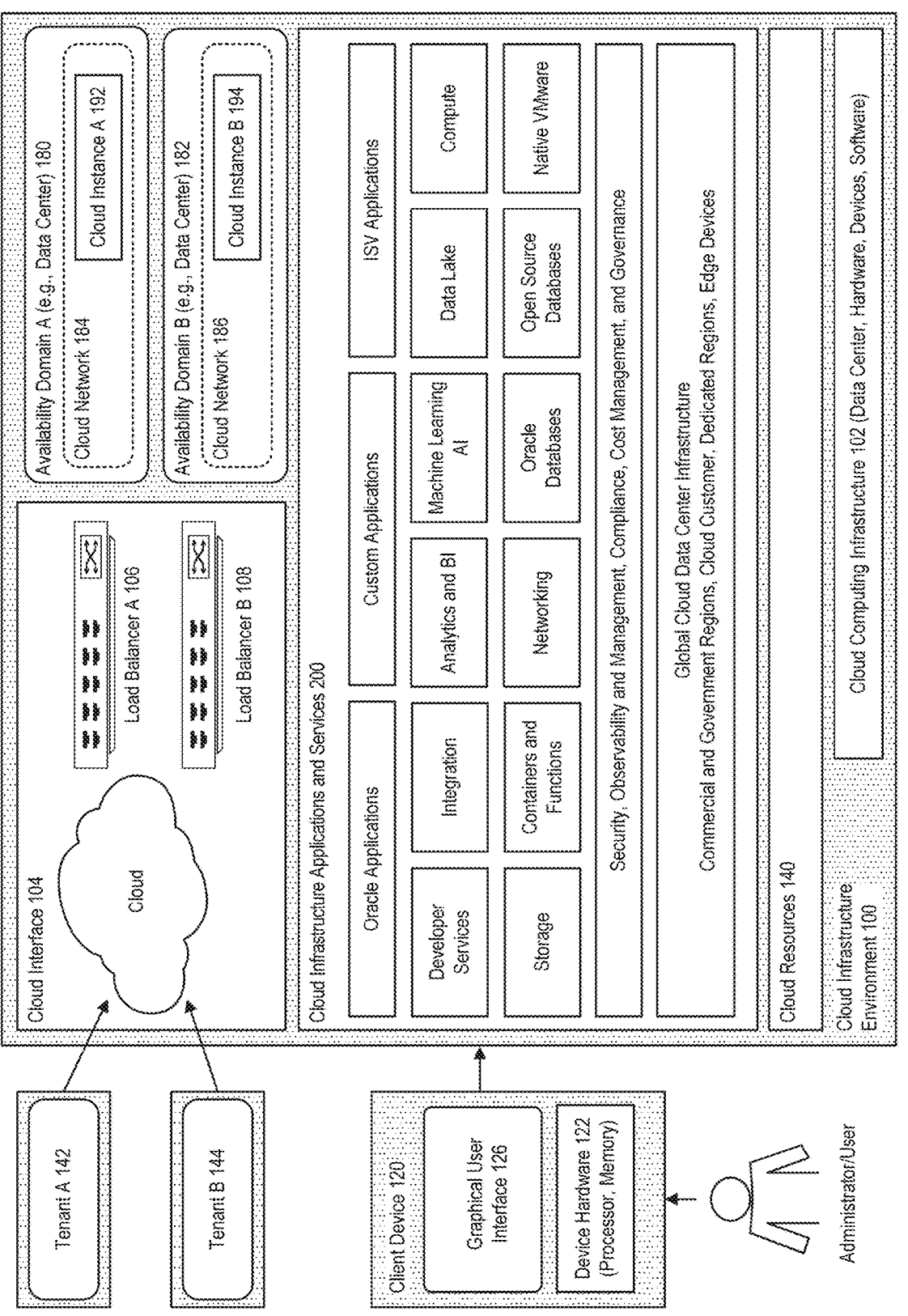
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, cloud instant B 194. In an embodiment, availability domain A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, tenant B 144, that provides a secure and isolated partition within the cloud infrastructure environment where the customer can create, organize, and administer their cloud resources. A cloud tenant/customer can access an availability domain and a cloud network to access each of their cloud instances. A tenancy is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
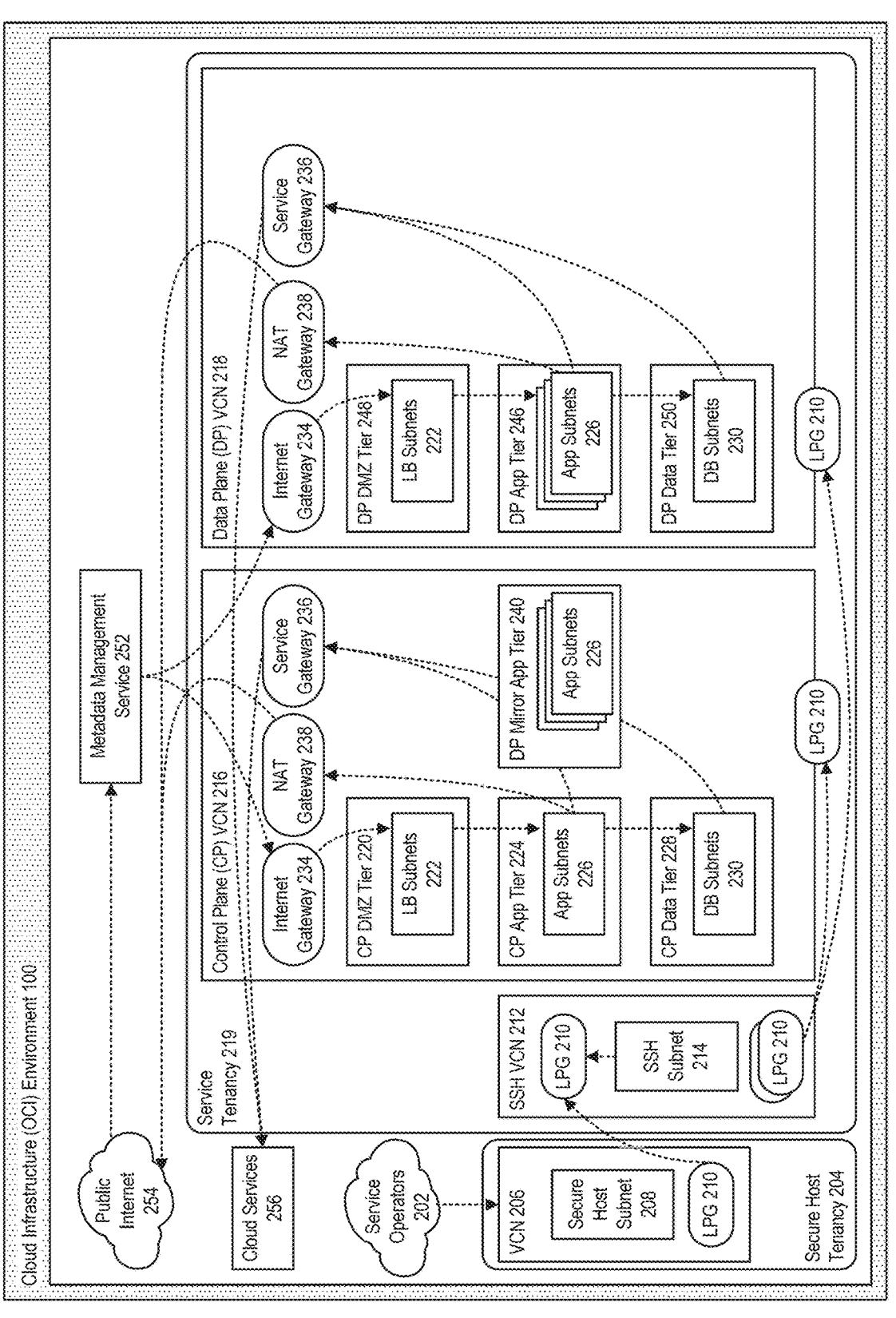
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
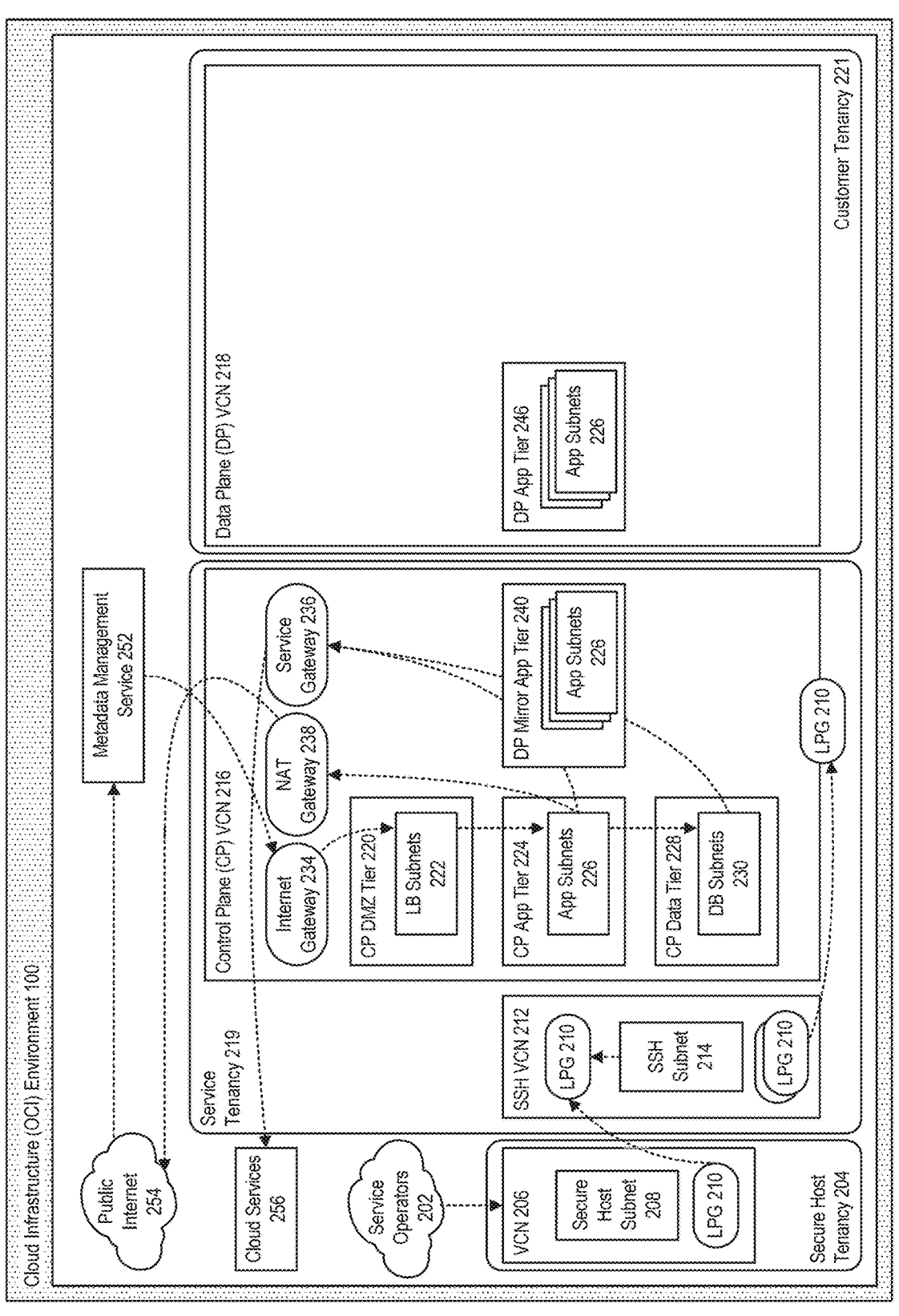
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
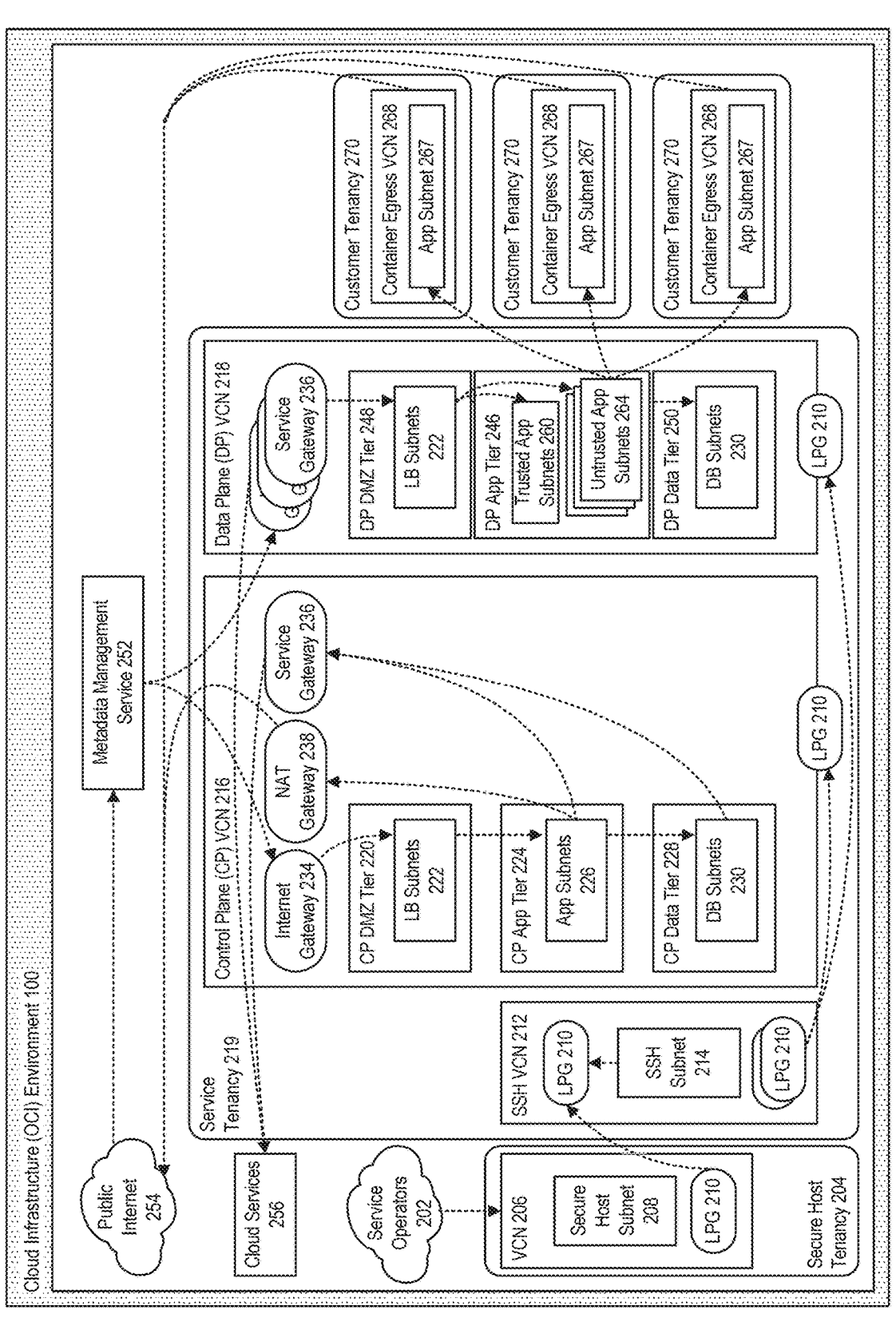
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
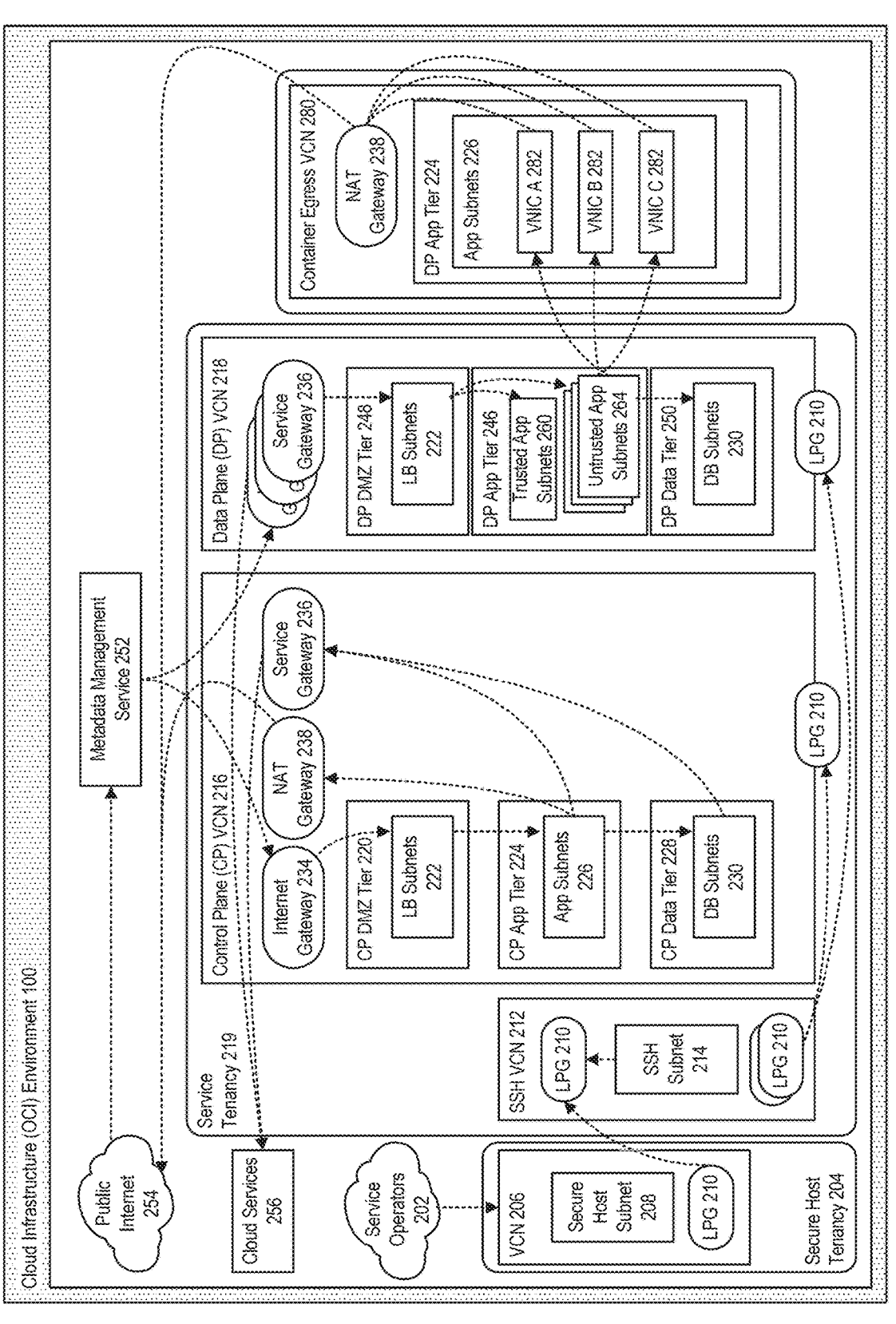
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
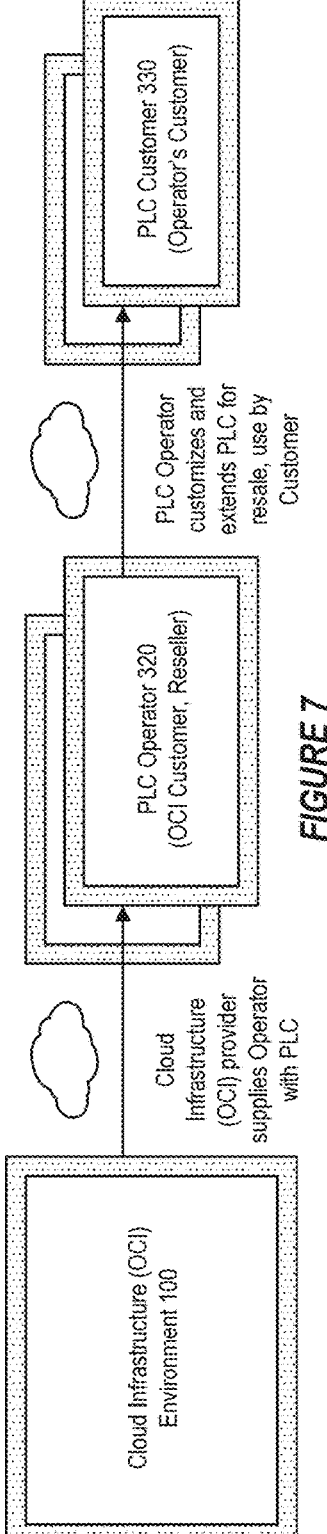
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., Oracle Cloud Infrastructure, OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
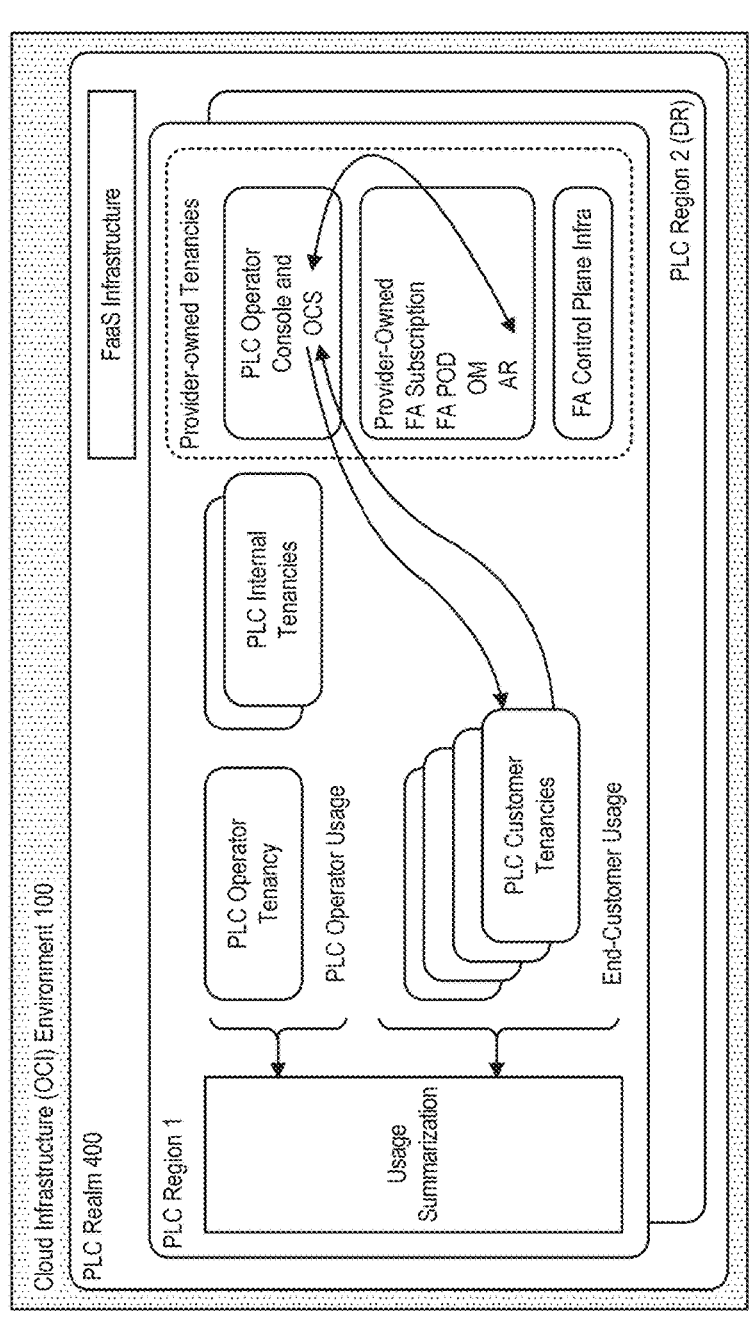
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, referred to herein in some embodiments as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of OCI, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
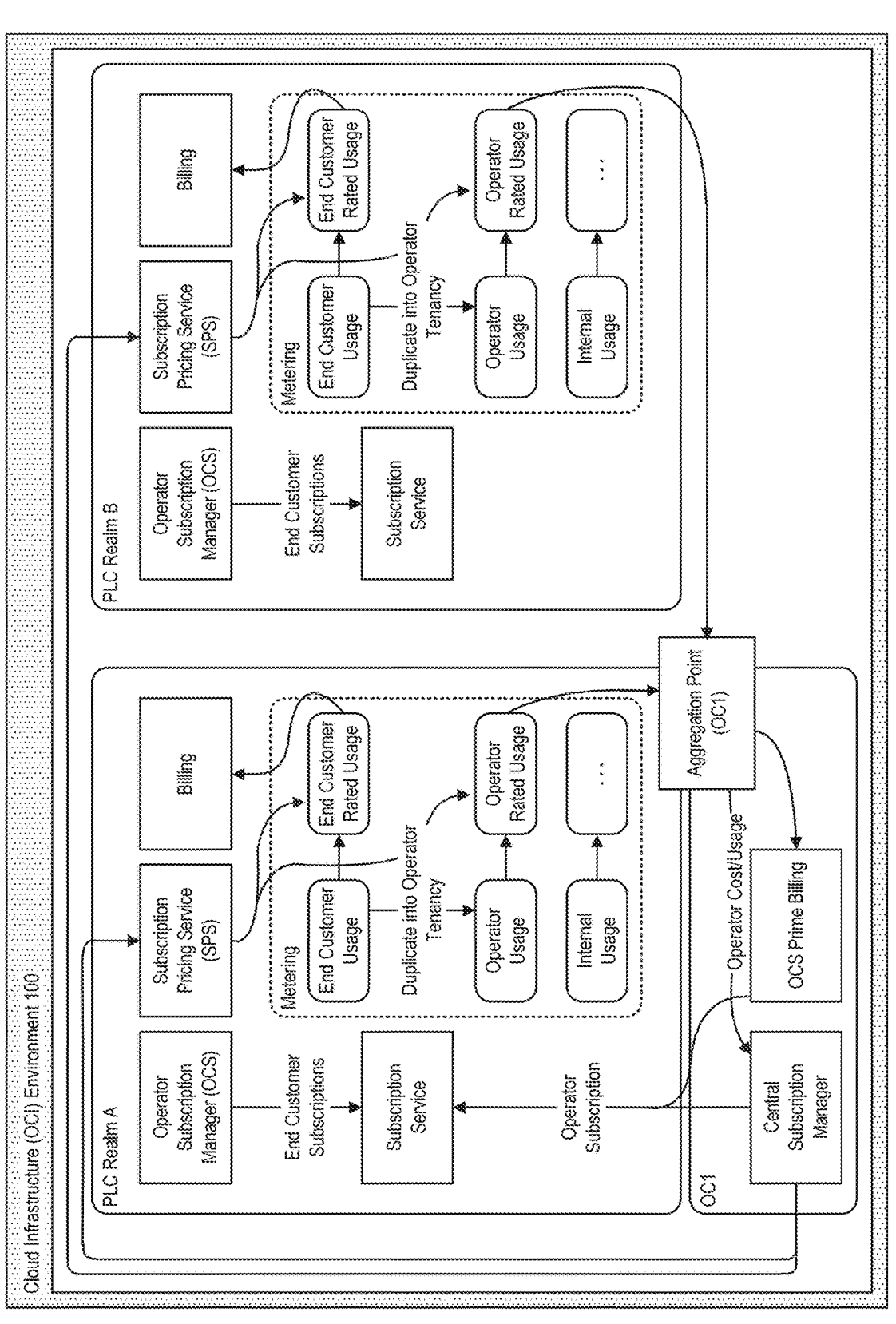
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, an Oracle Cloud Subscriptions (OCS) service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in OCS that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
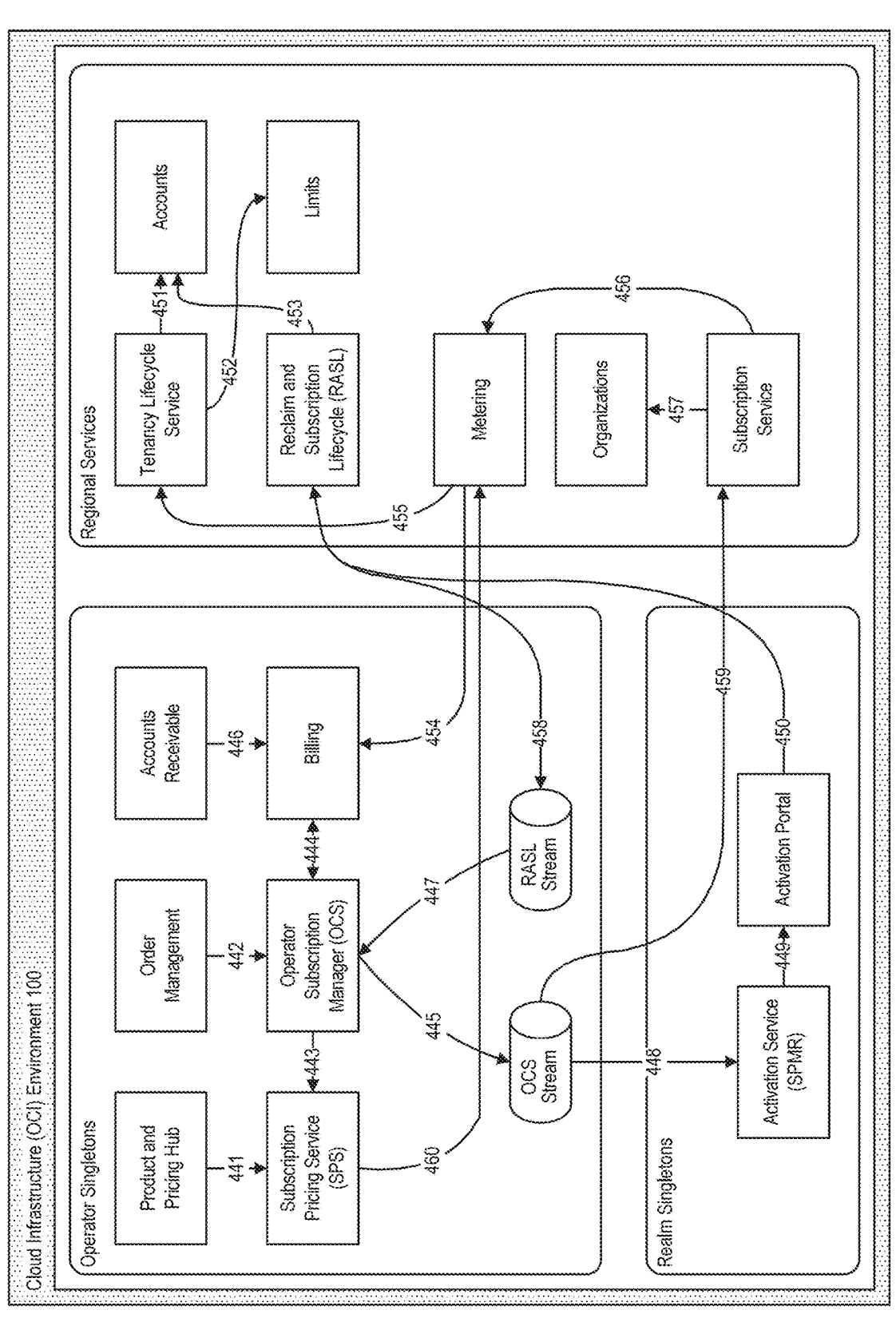
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The OCS service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can sync product information from an Oracle Fusion Product Hub and a global price list from an Oracle Fusion Pricing Hub.

In accordance with an embodiment, the OCS service operates as an upstream service to receive new order requests, for example, from an Oracle Fusion Order Management environment. The OCS service can provide subscription information to the SPS service. Subscription details like time of quote, configuration, and subscription type (Commitment, PayG) help SPS to determine an effective base price (Rate Card) for the subscription. The OCS service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the OCS component to create subscriptions, rate cards, and billing accounts. At 443, pricing configuration and pricing rules are sent to SPS for new orders. At 444, OCS is used to set up a billing account in the billing service or component. At 445, OCS publishes events to an OCI streaming component. At 446, charge data is sent to an accounts receivable component to generate invoices. At 447, OCS consumes reclaim and subscription lifecycle (RASL) events from OCI streaming. At 448, an activation service reads the OCS event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads OCS event stream. At 459, the subscription service reads OCS event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

3. Access Control Architecture

Figure 11:
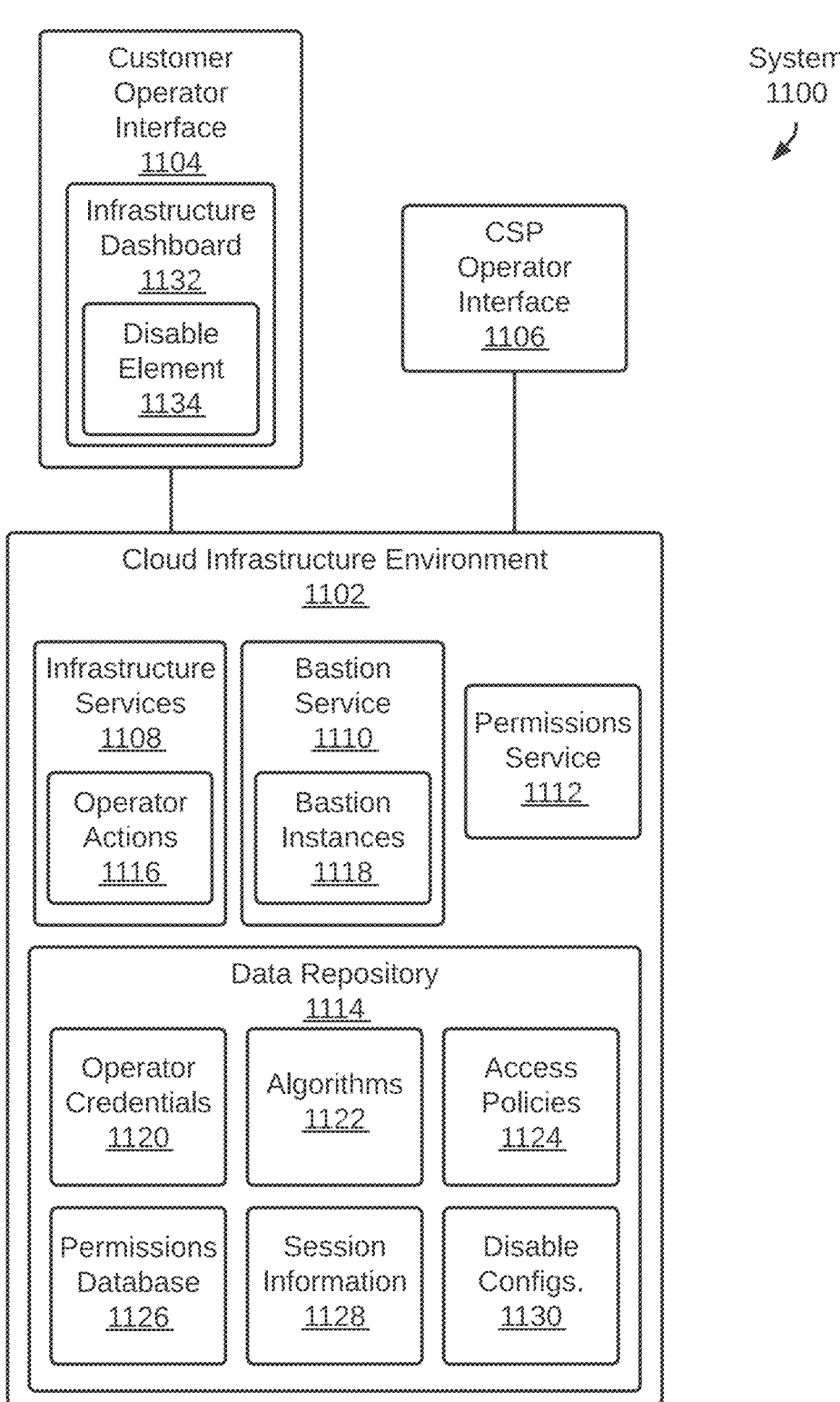
FIG. 11 illustrates a system for controlling operator access to resources within a customer cloud environment in accordance with one or more embodiments.

FIG. 11 illustrates a system 1100 in accordance with one or more embodiments. As illustrated in FIG. 11, system 1100 includes a cloud infrastructure environment 1102, a customer operator interface 1104, and a CSP provider operator interface 1106. In one or more embodiments, the system 1100 may include more or fewer components than the components illustrated in FIG. 11. The components illustrated in FIG. 11 may be local to or remote from each other. The components illustrated in FIG. 11 may be implemented in software and/or hardware. Components may be distributed over multiple applications and/or machines. Multiple components may be combined into one application and/or machine. Operations described with respect to one component may instead be performed by another component.

In one or more embodiments, cloud infrastructure environment 1102 refers to hardware, software, networking, and storage components that enable the delivery of cloud computing services. The cloud infrastructure environment 1102 further includes hardware and/or software configured to perform operations described herein for controlling operator access to cloud resources of the cloud infrastructure environment 1102. Examples of operations for controlling operator access to cloud resources of the cloud infrastructure environment 1102 are described below with reference to FIG. 12.

In an embodiment, cloud infrastructure environment 1102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the cloud infrastructure environment 1102 is a cloud computing infrastructure provided by a first entity, e.g., a CSP, to a second entity, e.g., a customer of the CSP. The customer of the CSP provides cloud services to a third entity, e.g., an organization or business. The CSP develops and provides the cloud infrastructure technology that powers the cloud infrastructure environment 1102. Customers of the CSP own and deploy the cloud infrastructure environment 1102. Customer operators, i.e., operators associated with customers of the CSP, are responsible for managing the cloud infrastructure environment 1102, including providing level 1 and level 2 support. Level 1 support may include the initial point of contact for users or customers and provide basic troubleshooting and assistance with common issues. Level 2 support may include handling escalated support tickets, conducting in-depth analysis and troubleshooting of technical issues, performing root cause analysis to identify underlying problems, providing advanced technical guidance and solutions, and collaborating with higher levels of support or specialized teams for complex issues that require further expertise. Higher levels of support are provided by CSP operators. The CSP operators maintain and update the core functionalities of the cloud infrastructure environment 1102, ensuring that the cloud infrastructure environment 1102 remains secure and up to date with new features.

In one or more embodiments, the cloud infrastructure environment 1102 is organized into cloud regions. Cloud regions are isolated from each other. A logical collection of one or more cloud regions is referred to as a realm. Realms are accessed separately. Customers of a region are unable to traverse realm boundaries to a region outside that realm.

In one or more embodiments, the cloud regions of the cloud infrastructure environment 1102 include isolated regions, e.g., Oracle Cloud Isolated Regions (OCIR) or Oracle Cloud National Security Regions (NSR). Isolated regions are highly secure and isolated environments within the cloud infrastructure environment that address the needs of customers with stringent security and compliance requirements. The isolated regions are designed to provide enhanced levels of isolation, control, and regulatory compliance for sensitive workloads and highly regulated industries, such as government, finance, healthcare, and defense.

In one or more embodiments, the cloud infrastructure environment 1102 includes infrastructure services 1108, a bastion service 1110, a permissions service 1112, and a data repository 1114.

In one or more embodiments, the infrastructure services 1108 for the cloud infrastructure environment 1102 encompass resources that enable delivery, management, and operation of cloud-based solutions. Infrastructure services 1108 encompass a wide range of services, including (a) compute services, e.g., virtual machines, containers, (b) storage services, e.g., object storage, block storage, (c) networking services, e.g., virtual networks, load balancing, (d) database services, e.g., relational databases, NoSQL Databases, (e) identity and access management, e.g., authentication, authorization, (f) monitoring and logging, e.g., metrics monitoring, logging and auditing, and/or (g) security services, e.g., firewalls, encryption.

In embodiments, the infrastructure services 1108 include an abuse service, a fraud service, a security service, and a compliance service. An abuse service or abuse management service addresses and mitigates various forms of abuse or misuse of cloud resources and services. The abuses may include various activities, such as spamming, phishing, malware distribution, denial-of-service (DOS) attacks, unauthorized access, or any behavior that violates the CSP's terms of service or acceptable use policies. A fraud service or fraud detection service detects, prevents, and mitigates fraudulent activities occurring within the cloud infrastructure or involving cloud-based services. The fraudulent activities may include unauthorized access, data breaches, identity theft, financial fraud, and other forms of malicious behavior aimed at exploiting cloud resources or compromising cloud-based systems. Security services protect cloud-based resources, applications, and data from various security threats and vulnerabilities. The security service may mitigate risks, enforce security policies, and maintain compliance with regulatory requirements. A compliance service ensures adherence to regulatory requirements, industry standards, and internal policies related to data protection, privacy, security, and governance.

In one or more embodiments, the infrastructure services 1108 are carried out by operators performing a wide range of operator actions 1116. Operator actions 1116 may include actions for provisioning and configuring, monitoring and alerting, scaling and optimizing, backup and disaster recovery, security management, patch management and updates, incident response and troubleshooting, compliance and governance, and performance optimization.

In one or more embodiments, operator actions 1116 that are available to operators differ between operators from different entities, operators from different services, and operators of different levels. For example, an operator associated with a customer of a CSP may not have access to the same operator actions as an operator associated with the CSP. Similarly, a CSP operator associated with a compliance service may not have access to the same operator actions as a CSP operator associated with a fraud service. The permissions service 1112 of the cloud infrastructure environment 1102 manages operator access to the operator actions 1116.

In one or more embodiments, a bastion service 1110 refers to a service that provides secure access to infrastructure services 1108 and other resources within a cloud infrastructure environment 1102. The bastion service 1110 creates bastion instances 1118 through which authorized users establish secure connections to resources in the cloud infrastructure environment 1102.

In one or more embodiments, bastion instances 1118, also known as bastion hosts or jump hosts, are specialized servers deployed within a network to provide secure access to the cloud infrastructure environment 1102. The bastion instances 1118 act as a gateway for operators, e.g., CSP operators, to access and manage other systems, such as virtual machines (VMs), servers, or databases, that are not directly exposed to the public internet. Bastion instances 1118 serve as a single entry point for accessing resources within a private network. Bastion instances are deployed with stringent security measures to prevent unauthorized access and protect sensitive data. Bastion instances enforce strong authentication mechanisms, such as multi-factor authentication (MFA) and key-based authentication, to verify the identity of users before granting access to internal resources. Bastion instances may implement role-based access control (RBAC) to ensure that operator access is restricted to the resources the operators are authorized to manage. Bastion instances may be deployed in a separate subnet or network segment isolated from the rest of the cloud infrastructure environment 1102. Isolation of the bastion instances minimizes the attack surface and reduces the risk of unauthorized access to internal systems.

In one or more embodiments, communication between an operator's client device and the bastion instance as well as between the bastion instance and internal resources is encrypted to protect the confidentiality and integrity of data transmitted over the network. Bastion instances 1118 may generate detailed logs of user activities and access attempts, providing a comprehensive audit trail for monitoring and compliance purposes. The logs created by the bastion instances can be analyzed to identify security incidents, unauthorized access attempts, or policy violations. Bastion instances 1118 may grant temporary access to users or administrators for a specific period after which the access is automatically revoked. Bastion instances may be deployed in a redundant configuration with built-in failover mechanisms to ensure continuous availability and uninterrupted access to internal resources even in the event of hardware or software failures.

In one or more embodiments, permissions services 1112 are systems and components responsible for managing access control and permissions for operators, applications, and resources in the cloud infrastructure environment 1102. The permissions services 1112 ensure that authorized users or entities have the appropriate level of access to cloud resources, data, and functionalities. The permission services 1112 may include identity and access management (IAM), access control lists (ACLs), key management services (KMS), API authorization and authentication, and network security groups (NSGs).

In one or more embodiments, the IAM services manage user identities, access rights, and permissions for accessing cloud services and resources. IAM services include various features, such as user authentication, authorization, user provisioning and deprovisioning, role-based access control, multi-factor authentication, and centralized policy management. IAM services allow organizations to define and enforce fine-grained access controls based on roles, groups, or individual operators, ensuring that accessing specific resources or performing certain actions is restricted to authorized operators.

In one or more embodiments the IAM services provide Just-In-Time (JIT) credentials. JIT credentials are access credentials, such as usernames and passwords, API keys, or temporary tokens, that are generated dynamically and provided to users or systems on-demand, immediately before the credentials are needed. JIT credentials may be short-lived and are valid for a limited period or for a specific use case. JIT credentials provide for on-demand generation, short-lived validity, scoped access, dynamic revocation, auditing, and logging. When an operator requests access to a resource or service, the IAM system dynamically generates a set of credentials specifically for that request. These credentials are created just-in-time and are not stored or predefined in advance. JIT credentials are designed to be temporary and have a limited lifespan. JIT credentials may be valid for a short period, such as a few minutes or hours, to minimize the risk of exposure and unauthorized use. JIT credentials may be scoped to a specific resource, service, or operation. JIT credentials may provide access to the resources or actions required to fulfill the immediate request and do not grant broader permissions beyond what is necessary. After the allotted time period or use case has expired, JIT credentials are automatically revoked or invalidated by the IAM system. JIT credential generation and usage are logged and audited by the permissions service 1112 to provide visibility into who accessed what resources and when.

In one or more embodiments, ACLs are used to define and enforce access control policies at the resource level, such as storage buckets, virtual machines, or databases. ACLs specify the users or entities that are granted access to a particular resource and what actions the users or entities are allowed to perform (e.g., read, write, execute). KMS services manage cryptographic keys used for encrypting and decrypting data in cloud environments. KMS services control access to encryption keys through access policies, allowing organizations to define who can manage and use encryption keys for protecting sensitive data.

In one or more embodiments, APIs provide programmatic access to resources and functionalities. API authorization and authentication services manage access to these APIs, ensuring that interacting with cloud resources via APIs is restricted to authorized applications or services. API authorization and authentication services may use standards such as OAuth 2.0 or JSON Web Tokens to secure API access. NSGs are used to define and enforce network-level access controls within a cloud environment. NSGs specify rules that control inbound and outbound traffic to and from cloud resources based on source and destination IP addresses, ports, and protocols.

In one or more embodiments, a data repository 1114 is any type of storage unit and/or device (e.g., a file system, database, collection of tables, or any other storage mechanism) for storing data. Further, a data repository 1114 may include multiple different storage units and/or devices. The multiple different storage units and/or devices may or may not be of the same type or located at the same physical site. Further, a data repository 1114 may be implemented or executed on the same computing system as the cloud infrastructure environment 1102. Additionally, or alternatively, a data repository 1114 may be implemented or executed on a computing system separate from the cloud infrastructure environment 1102. The data repository 1114 may be communicatively coupled to the cloud infrastructure environment 1102 via a direct connection or via a network.

Information describing the cloud infrastructure environment 1102 may be implemented across any components within the system 1100. However, this information is illustrated within the data repository 1114 for purposes of clarity and explanation. The data repository 1114 may include operator credentials 1120, algorithms 1122, access polies 1124, permissions database 1126, session information 1128, and disable configurations 1130.

In one or more embodiments, operator credentials 1120 refers to the information used to authenticate and verify the identity of a user or entity accessing a system, service, or resource. Operator credentials 1120 are used to prove the identity of operators, devices, or applications and determine if the operators, devices, or applications are authorized to access specific resources or perform certain actions. Operator credentials 1120 may include JIT credentials generated by the IAM of the permissions service 1112.

In one or more embodiments, operator credentials 1120 include username and password, API key, certificates, access tokens, and secure shell (SSH) keys. A combination of a unique identifier (username) and a secret passphrase (password) may be used to authenticate users and grant access to systems, applications, or online accounts. An alphanumeric string or token may be issued to applications or services to authenticate operator identity and authorize access to APIs or web services. Digital certificates may be issued by Certificate Authorities to authenticate the identity of users, devices, or servers in a cryptographic manner. Certificates are commonly used in HTTPS (HTTP over SSL/TLS) connections, VPNs (Virtual Private Networks), and digital signatures. Tokens may be issued to users or applications after successful authentication, allowing operators to access resources or services for a limited period. Public-private key pairs may be used for secure authentication and communication between systems using the SSH.

In one or more embodiments, operator credentials 1120 include biometric data, one-time passwords (OTP), and session tokens. Physiological or behavioral characteristics, such as fingerprints, iris scans, facial recognition, or voice patterns, may be used to verify the identity of individuals through biometric authentication systems. Temporary codes may be generated and sent to operators' devices (e.g., mobile phones) for authentication purposes. OTPs are typically valid for a single use or a short period and are commonly used in two-factor authentication (2FA) or multi-factor authentication (MFA) systems. Tokens may be generated and assigned to operators after successful authentication to maintain their authenticated session and authorize subsequent requests within a limited timeframe.

In one or more embodiments, a machine learning algorithm 1122 is an algorithm that can be iterated to train a target model f that best maps a set of input variables to an output variable. A machine learning algorithm is an algorithm that can be iterated to train a target model f that best maps a set of input variables to an output variable using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm that in turn updates the target model f.

A machine learning algorithm 1122 generates a target model f such that the target model f best fits the datasets of training data to the labels of the training data. Additionally, or alternatively, a machine learning algorithm 1122 generates a target model f such that when the target model f is applied to the datasets of the training data, a maximum number of results determined by the target model f matches the labels of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, access policies 1124 define the rules and permissions that govern who can access what resources and what actions they are allowed to perform within a cloud infrastructure environment 1102. Access policies are essential for enforcing security, compliance, and governance requirements. Access policies may specify the users, groups, roles, or service accounts that are granted access to specific cloud resources. Access policies may define the permissions granted to users or entities for interacting with specific cloud resources. Access policies may allow for granular control over permissions, enabling organizations to specify fine-grained access based on individual resources, attributes, or conditions. Access policies may include conditions that are required to be met for access to be granted, such as requiring multi-factor authentication (MFA), originating from specific network locations, or using specific client devices.

In one or more embodiments, the permissions database 1126 is a centralized repository for permissions, access controls, and authorization settings for various resources within the cloud infrastructure environment 1102. The permissions database 1126 may be utilized by the bastion service 1110 and the permissions service 1112 to enforce security policies, manage user access, and ensure compliance with regulatory requirements. The permissions database 1126 may store information about users, groups, roles, and their associated permissions for accessing specific resources or performing certain actions. Permissions information may include various details, such as user identities, resource identifiers, permissions granted (e.g., read, write, delete), and any conditions or restrictions associated with the permissions. The database provides a centralized location for managing access controls and authorization policies across the cloud infrastructure environment 1102. The permissions database 1126 may include audit logs and records of access activities for tracking changes to permissions, monitoring user access, and demonstrating compliance with regulatory requirements. Audit logs provide visibility into who accessed what resources, when the access occurred, and what actions were performed, aiding in security incident investigation and compliance audits.

In one or more embodiments, session information 1128 refers to data associated with a user's interaction with the cloud infrastructure environment 1102 during a specific period of time, known as a session. The session information 1128 may be recorded by the bastion service 1110. The session information 1128 may include various data elements that provide context about the operator's session and activities. Session information may include session ID, user identity, authentication status, session start and end times, session duration, client information, session state, access permissions, activity logs, and security context.

In one or more embodiments, a unique identifier may be assigned to a session and used to associate subsequent requests and interactions with the same session. Session information may include information about the operator associated with the session, such as username, user ID, or other user attributes. Session information may indicate if the user has been successfully authenticated for the session, i.e., through credentials or authentication tokens. Session information may include timestamps indicating when the session was initiated and terminated as well as the length of time that the session remained active, measured in seconds, minutes, or hours.

In one or more embodiments, the session information 1128 includes details about the client device or application used to access the system, such as IP address, user agent string, device type, and browser version. The session information may include any data or variables associated with the session that maintain the state of the user's interactions and activities within the system, e.g., form data, preferences, or other session-specific information. Session information may include information about the operator's access permissions and privileges within the cloud infrastructure environment 1102, including roles, permissions, and authorization tokens. Session information may include records of actions performed by the operator during the session, e.g., operator actions, form submissions, and other interactions. Session information may include security-related information about the session, such as security tokens, encryption keys, and security policies applied to protect the session and its data.

In one or more embodiments, disable configurations 1130 are a list of predetermined configurations for restricting access of one or more operators to one or more resources in the cloud infrastructure environment 1102. The disable configurations 1130 may relate to types of operators, e.g., customer operators, CSP operators, and administrators. The disable configuration 1130 may relate to particular services and or particular operator actions within those services. The disable configuration 1130 may also relate to the length of time operator access is disabled.

In one or more embodiments, customer operator interface 1104 refers to hardware and/or software configured to facilitate communications between a customer operator and the cloud infrastructure environment 1102. Customer operator interface 1104 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of customer operator interface 1104 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, customer operator interface 1104 is specified in one or more other languages, such as Java, C, or C++.

In one or more embodiments, the customer operator interface 1104 includes an infrastructure dashboard 1132. The infrastructure dashboard 1132 includes a disable element or interface 1134 for initiating a disable command for disabling operator access to the cloud infrastructure environment 1102. The disable element 1134 may include a button or other icon that can be engaged by a customer operator or administrator. The disable element 1134 may include various elements for configuring the disable command. For example, the disable element may include interface elements for selecting the actions to be initiated when the disable element is engaged, i.e., terminating existing sessions, revoking credentials, denying requests for new credentials, etc. The disable element may include one or more interface elements for selecting the type of operators for which service will be disabled, i.e., CSP operators, customer operators. The interface element may include individual operators. The disable element 1134 may include one or more interface elements for selecting the types of services to be disabled when the disable element 1134 is engaged. The disable element 1134 may include operator actions 1116 to be disabled when the disable element 1134 is engaged. The disable interface 1134 may include one or more interface elements for selecting a period of time that the disable command will remain engaged.

In one or more embodiments, the disable element 1134 or infrastructure dashboard 1132 may include a visual indication of the time remaining for the disable command. The disable command may automatically reverse at the end of a designated time period. Alternatively, a customer operator or administrator may reverse the disable command by reengaging the disable element 1134.

In one or more embodiments, CSP operator interface 1106 refers to hardware and/or software configured to facilitate communications between a CSP operator and the cloud infrastructure environment 1102. CSP operator interface 1106 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of CSP operator interface 1106 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, CSP provider interface 1106 is specified in one or more other languages, such as Java, C, or C++.

4. Controlling Operator Access to Cloud Resources

FIG. 12 illustrates an example set of operations for controlling operator access to customer cloud infrastructure environments in accordance with one or more embodiments. One or more operations illustrated in FIG. 12 may be modified, rearranged, or omitted. Accordingly, the particular sequence of operations illustrated in FIG. 12 should not be construed as limiting the scope of one or more embodiments.

One or more embodiments receive a request from an operator, e.g., CSP operator, to access resources in a customer cloud environment (Operation 1202). The operator initiates an access request through a designated access management channel. The designated access channel may include a service desk, ticketing system, self-service portal, or access request form. When submitting the access request, the provider may specify accesses through a bastion service. Indication of the type of access being requested may be performed through checkboxes, dropdown menus, or other selection mechanisms provided in the operator access request interface. In addition to providing authentication information, the operator may specify the type of access the operator is requesting. The type of access may include the resources that the operator is seeking to access, e.g., service(s), operator actions, etc. Alternatively, the permissions service may include a default set of services and/or operator actions for operators of a particular type and/or for particular operators.

In embodiments, the operator submits an authentication request to a permissions service. The request may include authentication credentials, e.g., a username/password pair, API key, or token. The permissions service validates the credentials provided in the authentication request to ensure the credentials are correct and authorized for authentication. Authentication may involve verifying the identity of the operator against a pre-approved directory of operators, validating the authenticity of the provided token, or checking the validity of the API key.

One or more embodiments determine if the operator meets requirements for access to the resources in the customer cloud environment (Operation 1204). When the request for access to the cloud infrastructure environment is made by an operator, the permissions service reviews the request. Using a permissions database, the permissions service verifies the legitimacy of the request, ensures that the request of access complies with security policies and access controls, and assesses any associated risks.

One or more embodiments deny the request for access (Operation 1206). When the permissions service is unable to authenticate a user and/or determines that the operator is not authorized access to the resources that the operator is requesting, the operator is denied access.

One or more embodiments permit operator access to resources in a customer cloud environment (Operation 1208). When the permissions service is able to authenticate the user and verify authorization to the requested resources, the access request is approved. The permissions service provisions the necessary access permissions through the bastion service. This may involve configuring user accounts, setting up authentication mechanisms, and granting privileges to access the requested resources via the bastion host. Once access has been provisioned through the bastion service, the operator may be notified that the access request has been approved. The operator may receive instructions on how to connect to the bastion host securely and access the requested resources within the customer cloud environment.

In one or more embodiments, the operator connects to the bastion service using secure remote access protocols, such as Secure Shell (SSH) or Remote Desktop Protocol (RDP), and authenticates themselves using their credentials. The bastion service provisions a set of one or more bastion instances. The operator sessions are established through the bastion instances. The bastion service may record information associated with sessions established through the bastion instances. The recorded information may include the type of operator requesting access, e.g., CSP operator or customer operator, and/or whether or not the session is a connection into a particular region of the customer cloud environment.

In some embodiments, after successful authentication, the permissions service performs an authorization check to determine if the operator is allowed to establish the requested session. Authorization involves evaluating the permissions of the operator, roles, and access policies to determine if the operator has the necessary rights to access the requested resources or perform the requested operations.

One or more embodiments receive a command to disable operator access to the resources in the customer cloud environment (Operation 1210). The command to disable CSP operator access may be received in response to a customer operator clicking on an interface feature of a customer dashboard. Alternatively, the command may be received as an API call made by the customer operator.

In one or more embodiments, an operator, such as an administrator or an operator of the customer's security team, interacts with a dashboard provided by the CSP. This dashboard may be part of a management console or administration portal. The customer operator navigates through the dashboard interface and selects the specific resources or permissions associated with the operator access to be disabled. This may include selecting individual operators, roles, or groups as well as specifying the types of resources affected. Alternatively, the categories of operators and resources affected may be predetermined or may be determined using a machine learning algorithm. The customer operator triggers the command to disable operator access by clicking on an icon, button, or menu option within the dashboard interface. This action signals the intent to modify access permissions and initiates the process of sending the command to the bastion service and/or permissions service.

In one or more embodiments, the disable interface is provided on a dashboard as a big red button. Prominence of the big red button, as to size, location, and color, allows the button to be easily identified. The disable interface may include additional interfaces, e.g., buttons, pull-down menus, for customizing the disable command. Customization may include selecting some operators and some actions without affecting other operators and other actions. Once the disable command is activated, a countdown clock or other visual for indicating a length of time before the disable command is reversed may be displayed. The length of time may be extendable to a maximum length of time, e.g., 30 mins., 2 hrs., 6 hrs. Alternatively, the disable command may stay activated until a customer operator or administrator deactivates the disable command. A customer operator may deactivate the disable command by re-engaging the big red button.

In one or more embodiments, the bastion service and/or permission service receive the command from the dashboard interface. Receipt of the command may involve a combination of frontend web technologies (such as JavaScript)

handling user interactions and backend server-side components processing and executing the command. Services verify the authenticity and authorization of the command. Verification of authenticity and authorization includes validating the customer or administrator's identity, checking the permissions or roles of the operator, and ensuring that the requested action aligns with applicable policies, permissions, and compliance requirements. Once the command is authorized and validated, the services execute the necessary actions to disable operator access to the specified resources in the cloud infrastructure environment. Disabling of operator access may include lag time as the operations to disable operator access propagate through the system.

In one or more embodiments, the action to disable operator access may involve updating access control configurations, revoking authentication tokens or credentials, and/or modifying permissions or roles associated with the affected resources. This may include placing a flag or other notation in the permissions database for the affected operators and/or resources. The dashboard interface provides feedback to the customer operator, indicating that the command to disable operator access has been processed successfully. Confirmation may include visual indicators, e.g., change of color to an interface, status messages, or notifications within the dashboard interface that inform the customer operator of the outcome of the action. The interface feature may visually indicate a countdown for when the disable command expires.

In one or more embodiments, the bastion service and/or permissions service log details of the command execution for auditing and compliance purposes. Recorded information may include the customer operator or administrator that initiated the command, the resources affected, the time of execution, and any relevant metadata associated with the action.

In one or more embodiments, the command to disable operator access is initiated through an API call. A client application or system may send an API request to the cloud infrastructure API endpoint, specifying the details of the command to disable operator access. The request may include various parameters, such as the type of resources to be affected, the specific operators or roles whose access should be disabled, and any other relevant information. The API request is authenticated and authorized by the cloud infrastructure API gateway or authentication service. This involves validating the credentials provided in the request (such as API keys, OAuth tokens, or client certificates) and checking the permissions or roles associated with the customer operator to ensure the customer operator has the necessary rights to execute the command. The API endpoint receives the request and validates the content of the request to ensure the request is consistent with the API's schema and specifications. Validation of the request may include checking for required parameters, data types, and other validation rules to prevent errors or misuse of the API.

In embodiments, once the request to disable operator access has been authenticated, authorized, and validated, the API endpoint executes the command to disable operator access to the specified resources in the customer's cloud environment. This involves invoking services or workflows responsible for updating access control configurations, revoking authentication tokens or credentials, and enforcing the access restriction. After executing the command, the API endpoint sends a response back to the client application or system that initiated the API call. This response indicates the outcome of the command execution, including if it was successful or if any errors occurred during the process. The response may also include additional details or metadata related to the action taken. By initiating commands through API calls, users can programmatically manage and automate access control operations, such as disabling operator access to resources, in a customer's cloud environment.

Responsive to receiving the command, one or more embodiments terminate existing sessions providing CSP operator access to the resources in the customer cloud environment (Operation 1212). The bastion service terminates existing sessions established through bastion instances by actively managing and controlling access to the bastion instances. More particularly, the bastion service identifies active sessions currently established through bastion instances. This may involve querying logs, monitoring network traffic, or consulting a session management database. The bastion service receives a request or trigger to terminate specific sessions. This request could come from a customer operator or an administrator, a security system, or be triggered automatically based on predefined policies or rules. The bastion service may initiate the termination of the identified sessions by sending termination commands or signals to the bastion instances hosting those sessions. This could involve closing network connections, killing processes, or forcibly logging out operators. Once the sessions have been terminated, the bastion service confirms the successful termination and logs the event for auditing and compliance purposes. This includes recording details, such as the operators associated with the terminated session, the time of termination, and any relevant metadata.

In one or more embodiments, the bastion service notifies the affected operators that their sessions have been terminated. This notification could include information about the reason for termination and any instructions or next steps for re-establishing access. The notification may be presented as a banner on a user interface of the operator. The notification may include an estimated length of time for suspension of access.

In one or more embodiments, the bastion service verifies that the terminated sessions are no longer active and that access has been effectively revoked. The bastion service may perform additional cleanup tasks, such as removing session metadata or updating session management records to reflect the termination. The bastion service enforces policies to prevent unauthorized re-establishment of terminated sessions. This may involve implementing access controls, authentication mechanisms, or session timeout policies to ensure that accessing bastion instances and establishing new sessions are restricted to authorized users.

Responsive to receiving the command, one or more embodiments reject a new request for credentials to establish sessions providing CSP operator access to the resources in the customer cloud environment (Operation 1214). Instead of or in addition to terminating existing sessions, new requests for credentials may be rejected by the permissions service. When the command to disable operator access to resources in the customer cloud environment is made, a flag or notation is added to the list of pre-approved operators identifying the operators that are affected by the disable command. When a request for credentials is received by the permissions service, the permissions service consults the list of pre-approved operators and denies credentials to operators flagged on the list. The disable command may be limited to individual operators, a group or class of operators, or all operators. Operators may be differentiated by the entity the operators are associated with and/or the resources that the operators are authorized to access.

Responsive to receiving the command, one or more embodiments revoke existing credentials used to establish sessions providing CSP operator access to the resources in the customer cloud environment (Operation 1216). Existing credentials used to establish sessions may be revoked by the permissions service. The permissions service identifies the credentials to be revoked. This could include authentication tokens, session identifiers, API keys, or other forms of credentials used to establish a session. The permissions service receives a request or trigger indicating that the credentials should be revoked. This could be initiated by a customer operator or an administrator in response to a security incident or based on predefined policies or rules. The permissions service updates the authorization store or database to mark the identified credentials as revoked. This may involve setting a flag or status indicating that the credentials are no longer valid for authentication or access. The permissions service ensures that the revocation status is propagated to relevant components and services that rely on the credentials for authentication or access control. This may involve updating caches, databases, or distributed systems to reflect the change in credential status.

In one or more embodiments, the permissions service notifies the operator(s) whose credentials have been revoked, informs the operator(s) of the change, and provides guidance on next steps. Guidance provided to the operators may be for reauthentication, obtaining new credentials, or contacting support for assistance. The permissions service may enforce the revocation by rejecting any subsequent authentication attempts or access requests using the revoked credentials. This prevents the operator or entity from continuing to use the invalidated credentials to establish sessions or access resources. The permissions service may periodically review and clean up revoked credentials to ensure that the authorization store remains up-to-date and free from expired or unnecessary entries, thereby maintaining the integrity and efficiency of the authentication and access control system.

One or more embodiments reverse one or more of, terminating existing sessions, rejecting new requests for credentials, or revoking existing credentials, to allow for CSP operator access to the resources in the customer cloud environment (Operation 1218). Once the designated period of time for disabling operator access has elapsed or the customer operator deactivates the disable access command, the operations for disabling operator access are reversed. This may include reestablishing the sessions that were terminated, granting new request for credentials, and reinstating the credentials that were revoked. The permissions database may be updated by removing any flags that were placed when the disable command was activated.

5. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 13:
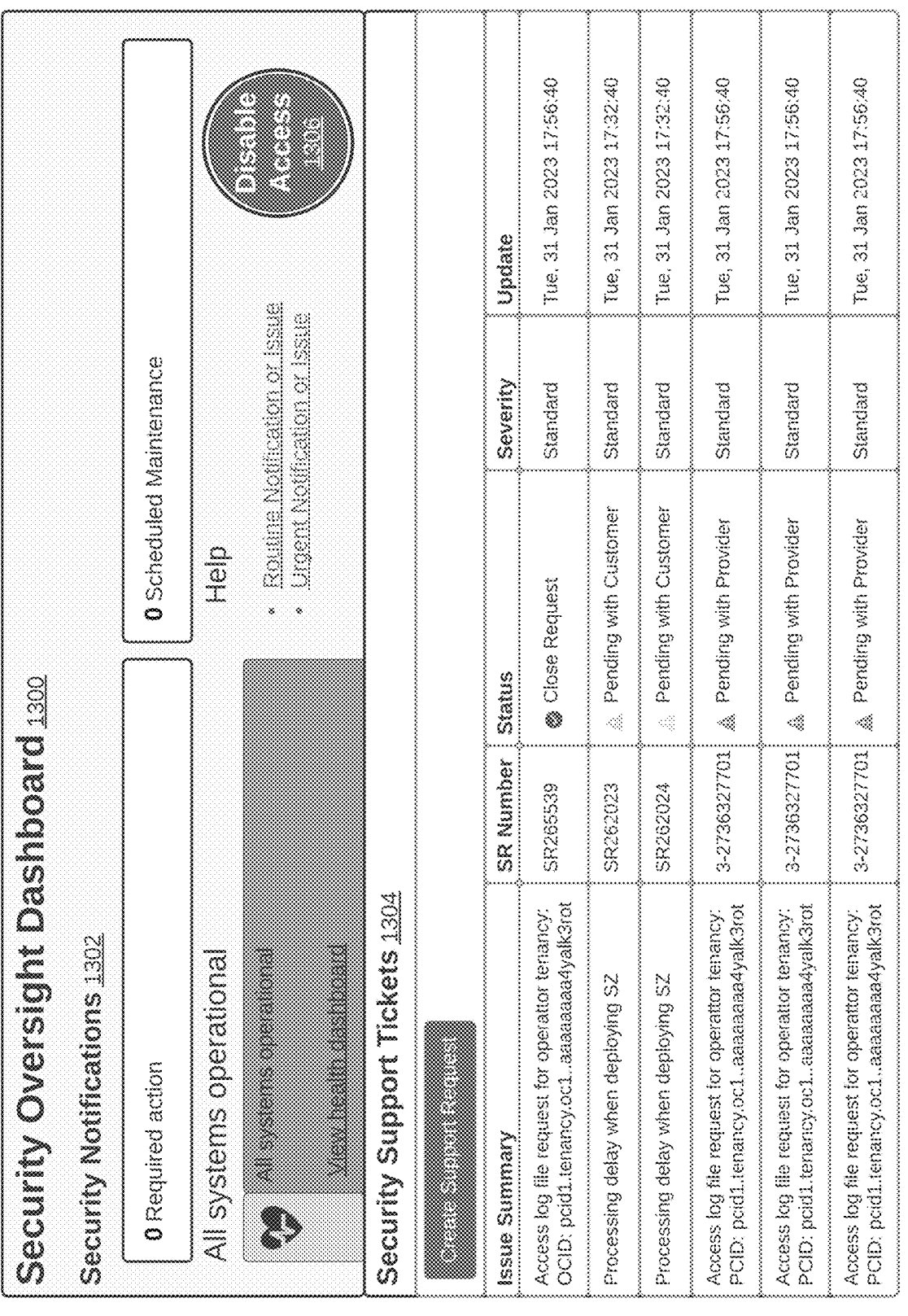
FIG. 13 illustrates an example of a customer-facing infrastructure security dashboard in accordance with one or more embodiments.

FIG. 13 illustrates a dashboard provided to the operators and administrators associated with the customer of the cloud service provider. As shown, the Security Oversight Dashboard 1300 provides customer operators and administrators with information related to the infrastructure security of the customer's cloud infrastructure environment. More particularly, the dashboard 1300 includes interfaces for providing security notifications 1302 and security support tickets 1304. The dashboard 1300 further provides a disable access button 1306. By engaging the disable access button 1306, operator access to the customer cloud infrastructure environment is disabled. Although shown as a simple button, the disable access button 1306 may include interface elements for selecting the operator access to disable and for which resources.

6. Practical Applications, Advantages & Improvements

The ability for customers of cloud service providers to disable operator access to the customer cloud infrastructure environment permits the customers to respond quickly to security incidents or potential threats, thereby limiting the attack surface and reducing the risk of unauthorized access. The ability to disable or suspend operator access to customer cloud infrastructure environments allows customers to meet regulatory compliance requirements, thus, ensuring adherence to data protection and privacy regulations.

In the event of a security breach or suspicious activity, the ability to disable operator access permits the customer time to investigate the cause of the breach or activity and prevent further damage or data loss. Disabling or suspending operator access may also reduce the risk of insider threats, human errors, or unauthorized activities that could compromise the integrity, confidentiality, or availability of cloud resources.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media comprising instructions which, when executed by one or more hardware processors, cause performance of operations comprising:

receiving, from a customer operator associated with a customer of a cloud service provider (CSP), a command to disable CSP operator access to a first set of resources in a customer cloud environment;

wherein the CSP operator access to the first set of resources in the customer cloud environment is permitted based on a set of permissions; and responsive to the command, performing one or more operations that disable the CSP operator access to the first set of resources, comprising one or more of:

terminating one or more existing sessions that provide the CSP operator access to the first set of resources in the customer cloud environment, wherein the one or more existing sessions were established based at least in part on the set of permissions;

rejecting one or more new requests for credentials to establish sessions that provide the CSP operator access to the first set of resources in the customer cloud environment, wherein the one or more new requests for credentials are made based at least in part on the set of permissions; or revoking existing credentials used to establish the one or more existing sessions that provide the CSP operator access to the first set of resources in the customer cloud environment, wherein the existing credentials were granted based at least in part on the set of permissions;

wherein the command to disable the CSP operator access to the first set of resources in the customer cloud environment is associated with a designated time period; and responsive to detecting a conclusion of the designated time period, reversing the one or more operations that disable the CSP operator access to the first set of resources.

2. The one or more non-transitory computer-readable media of claim 1, wherein terminating the one or more existing sessions is performed by a bastion service configured to provision a set of bastion instances through which the one or more existing sessions are established, wherein the bastion service records information associated with the one or more existing sessions to generate recorded information, the recorded information including at least one of:

(a) if a requestor of the one or more existing sessions is a CSP operator, or (b) if the one or more existing sessions is a connection into the customer cloud environment;

wherein the bastion service identifies the one or more existing sessions to be terminated based on the recorded information;

wherein the bastion service terminates the one or more existing sessions identified by the bastion service.

3. The one or more non-transitory computer-readable media of claim 1, wherein rejecting the one or more new requests for credentials is performed by a permissions service configured to manage the set of permissions.

4. The one or more non-transitory computer-readable media of claim 1, wherein revoking the existing credentials is performed by a permissions service configured to manage the set of permissions.

5. The one or more non-transitory computer-readable media of claim 1, wherein the command requests to disable the CSP operator access to all resources in the customer cloud environment, and one or more of the following is performed:

(a) terminating all existing sessions;

(b) rejecting all new requests for credentials; or (c) revoking all existing credentials.

6. The one or more non-transitory computer-readable media of claim 1, wherein the command requests to disable the CSP operator access to a subset of resources in the customer cloud environment, and one or more of the following is performed:

(a) terminating a subset of existing sessions corresponding to the subset of resources;

(b) rejecting a subset of new requests for credentials corresponding to the subset of resources; or (c) revoking a subset of existing credentials corresponding to the subset of resources.

7. The one or more non-transitory computer-readable media of claim 1, the operations further comprising: reversing one or more of:

(a) terminating the one or more existing sessions;

(b) rejecting the one or more new requests for credentials; or (c) revoking the existing credentials.

8. The one or more non-transitory computer-readable media of claim 1, wherein the command sets a flag in a database accessible by one or more of (a) a bastion service configured to provision a set of bastion instances through which the one or more existing sessions are established or (b) a permissions service configured to manage the set of permissions.

9. The one or more non-transitory computer-readable media of claim 1, wherein terminating the CSP operator access to the first set of resources does not terminate the CSP operator access to a second set of resources in the customer cloud environment.

10. The one or more non-transitory computer-readable media of claim 1, wherein terminating the CSP operator access applies to a first CSP operator and does not terminate access for a second CSP operator.

11. The one or more non-transitory computer-readable media of claim 1, wherein the CSP is a first entity, the customer of the CSP is a second entity, and the customer of the CSP provides cloud services to an end user associated with a third entity.

12. The one or more non-transitory computer-readable media of claim 1, wherein the command to disable the CSP operator access is an application programming interface call made in response to user input supplied by the customer operator.

13. A method comprising:

receiving, from a customer operator associated with a customer of a cloud service provider (CSP), a command to disable CSP operator access to a first set of resources in a customer cloud environment;

wherein the CSP operator access to the first set of resources in the customer cloud environment is permitted based on a set of permissions; and responsive to the command, performing one or more operations that disable the CSP operator access to the first set of resources, comprising one or more of:

terminating one or more existing sessions that provide the CSP operator access to the first set of resources in the customer cloud environment, wherein the one or more existing sessions were established based at least in part on the set of permissions;

rejecting one or more new requests for credentials to establish sessions that provide the CSP operator access to the first set of resources in the customer cloud environment, wherein the one or more new requests for credentials are made based at least in part on the set of permissions; or revoking existing credentials used to establish the one or more existing sessions that provide the CSP operator access to the first set of resources in the customer cloud environment, wherein the existing credentials were granted based at least in part on the set of permissions;

wherein the command to disable the CSP operator access to the first set of resources in the customer cloud environment is associated with a designated time period; and responsive to detecting a conclusion of the designated time period, reversing the one or more operations that disable the CSP operator access to the first set of resources;

wherein the method is performed by at least one device including a hardware processor.

14. The method of claim 13, wherein terminating the one or more existing sessions is performed by a bastion service configured to provision a set of bastion instances through which the one or more existing sessions are established, wherein the bastion service records information associated with the one or more existing sessions to generate recorded information, the recorded information including at least one of:

(a) if a requestor of the one or more existing sessions is a CSP operator, or (b) if the one or more existing sessions is a connection into the customer cloud environment;

wherein the bastion service identifies the one or more existing sessions to be terminated based on the recorded information;

wherein the bastion service terminates the one or more existing sessions identified by the bastion service.

15. The method of claim 13, wherein rejecting the one or more new requests for credentials is performed by a permissions service configured to manage the set of permissions.

16. The method of claim 13, wherein revoking the existing credentials is performed by a permissions service configured to manage the set of permissions.

17. The method of claim 13, wherein the command requests to disable the CSP operator access to all resources in the customer cloud environment, and one or more of the following is performed:

(a) terminating all existing sessions;

(b) rejecting all new requests for credentials; or (c) revoking all existing credentials.

18. The method of claim 13, wherein the command requests to disable the CSP operator access to a subset of resources in the customer cloud environment, and one or more of the following is performed:

(a) terminating a subset of existing sessions corresponding to the subset of resources;

(b) rejecting a subset of new requests for credentials corresponding to the subset of resources; or (c) revoking a subset of existing credentials corresponding to the subset of resources.

19. The method of claim 13, further comprising: subsequent to a conclusion of the designated time period, reversing one or more of:

(a) terminating the one or more existing sessions;

(b) rejecting the one or more new requests for credentials; or (c) revoking the existing credentials.

20. A system comprising:

at least one device including a hardware processor;

the system being configured to perform operations comprising:

receiving, from a customer operator associated with a customer of a cloud service provider (CSP), a command to disable CSP operator access to a first set of resources in a customer cloud environment;

wherein the CSP operator access to the first set of resources in the customer cloud environment is permitted based on a set of permissions; and responsive to the command, performing one or more operations that disable the CSP operator access to the first set of resources, comprising one or more of:

terminating one or more existing sessions that provide the CSP operator access to the first set of resources in the customer cloud environment, wherein the one or more existing sessions were established based at least in part on the set of permissions;

rejecting one or more new requests for credentials to establish sessions that provide the CSP operator access to the first set of resources in the customer cloud environment, wherein the one or more new requests for credentials are made based at least in part on the set of permissions; or revoking existing credentials used to establish the one or more existing sessions that provide the CSP operator access to the first set of resources in the customer cloud environment, wherein the existing credentials were granted based at least in part on the set of permissions;

wherein the command to disable the CSP operator access to the first set of resources in the customer cloud environment is associated with a designated time period; and responsive to detecting a conclusion of the designated time period, reversing the one or more operations that disable the CSP operator access to the first set of resources.

* * * * *